Figure 1:
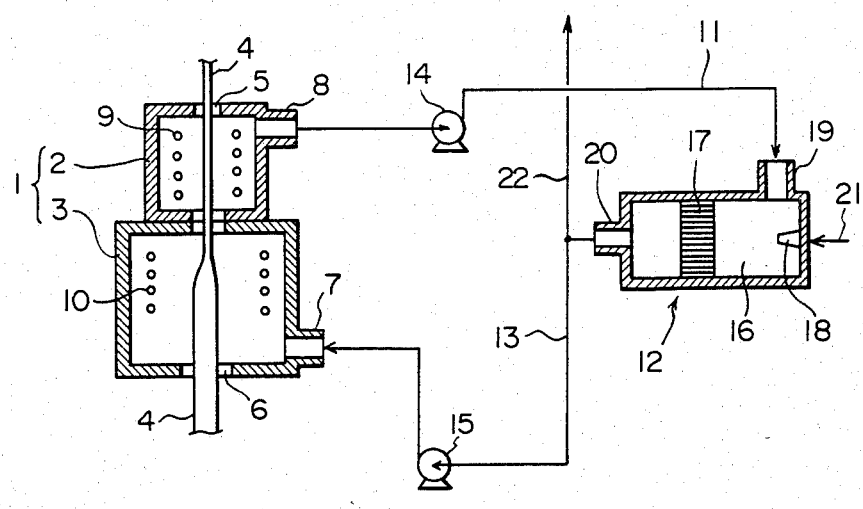

United States Patent [19]

Iwai et al.

[11] Patent Number: 4,508,669
[45] Date of Patent: Apr. 2, 1985

[54] PROCESS AND APPARATUS FOR PRODUCING THERMOPLASTIC RESIN FOAM

[75] Inventors: Noboru Iwai, Osaka; Masanori Hirunuma, Kazo; Junichi Kaneko, Hasuda, all of Japan

[73] Assignee: Sekisui Kagaku Kogyo Kabushiki Kaisha, Osaka, Japan

[21] Appl. No.: 604,316

[22] Filed: Apr. 25, 1984

[30] Foreign Application Priority Data

Apr. 27, 1983 [JP] Japan ................. 58-75393

[51] Int. Cl.$^3$ ............................................. B29H 5/06
[52] U.S. Cl. ................................... 264/36; 521/82; 521/95; 521/143; 521/145; 521/150; 521/917
[58] Field of Search ............ 264/36, 54, DIG. 5; 521/82, 140, 917, 95, 143, 145, 150

[56] References Cited

U.S. PATENT DOCUMENTS 4,124,344 11/1978 Kiyono et al. ................ 264/25
4,213,975 7/1980 Kiyono et al. ................ 264/25

*Primary Examiner*—Morton Foelak
*Attorney, Agent, or Firm*—Wenderoth, Lind & Ponack

[57] ABSTRACT

In a process for producing a thermoplastic resin foam which comprises continuously heat-foaming a foamable thermoplastic resin sheet containing a heat-decomposable organic blowing agent with a heated gas, the improvement wherein a gas containing sublimation products generated by the heat-foaming of the foamable sheet is burned to decompose the sublimation products and obtain a treated gas having a substantially reduced content of the sublimation products, and the treated gas is then used as the heated gas for the heat-foaming of the foamable sheet; and a apparatus for producing a thermoplastic resin foam by continuously heat-foaming a foamable thermoplastic resin sheet, said apparatus comprising a heat-foaming chamber having an inlet portion for feeding the foamable thermoplastic resin sheet, an outlet portion for discharging the foamed sheet, a discharge port for a gas containing sublimation products generated by the heat-foaming of said foamable sheet, and a supply port for a heated gas, said discharge port and said supply port being connected by pipe lines to form a circulating pipe line, and said circulating pipe passage having a burning device for burning said gas containing sublimation products.

6 Claims, 2 Drawing Figures

PROCESS AND APPARATUS FOR PRODUCING THERMOPLASTIC RESIN FOAM

This invention relates to a process and an apparatus for producing a thermoplastic resin foam. More specifically, it relates to a process and an apparatus for producing a thermoplastic resin foam, wherein in the continuous foaming of a foamable thermoplastic resin sheet under heat, the waste gas generated as a result of heat-foaming is utilized for the heat-foaming step to save energy and prevent air pollution.

In the prior art, a foamed sheet of a thermoplastic resin is produced by a process which comprises mixing a thermoplastic resin such as polyethylene with a heat-decomposable organic blowing agent, molding the mixture into a sheet form by an extruder or the like, crosslinking the sheet by a crosslinking agent or by irradiation such as ionizing radiation, and then heating the crosslinked sheet to decompose the organic blowing agent and thus foam the sheet.

In order to obtain a uniform closed-cellular foamed sheet having a smooth surface continuously and efficiently, a method for heat-foaming is known which involves introducing a heated gas into a heat-foaming chamber, and passing the formable sheet through the chamber (see, for example, Japanese Patent Publication No. 18832/1967). This method, however, has the defect that it requires a hot air generating device for continuously producing a gas heated at about 250° to about 350° C., and since the energy consumed by this device is high, large expenditures must be spent for fuel consumption.

Attempts have therefore been made to increase the output per unit time and reduce the energy consumed per unit output by pre-heating the foamable sheet before it is introduced into the heat-foaming chamber and increasing the speed of feeding the foamable sheet (see, for example, U.S. Pat. Nos. 3,711,584, 3,762,845, 4,124,344 and 4,213,925). However, they have failed to offer a complete solution to the above problem.

In recent years, investigations were made to take measures for energy saving by, for example, utilizing the waste gas generated by heat-foaming as a feed gas for heat-foaming the foamable sheet, or utilizing the heat of the waste gas for heating fresh air to be fed to the heat-foaming chamber by a heat-exchanger. The first-mentioned method has the disadvantage that sublimation products resulting from decomposition of additives such as the organic blowing agent contained in the waste gas deposit in the pipe line as the temperature falls, and contaminate the surface of the product. The latter method may be effective for a short period of time, for example up to several days. But with the lapse of time, the waste gas on the high-temperature side of the heat exchanger radiates heat, and with the consequent lowering of the temperature, sublimation products deposit. As a result, the powdery residue adheres to and accumulates on the heat-exchanger to block up the gas passage. This results in a large pressure drop and a decreased heat-exchanging efficiency. This trouble may be prevented by occasionally cleaning the wall surface of the heat-exchanger. Since, however, the required frequency of cleaning is high, this method is not industrially advantageous.

Desirably, the waste gas should not be released as such into the atmosphere because it contains decomposition products of organic substances. For this purpose, the waste gas may be treated by using a scrubber adapted to wash the waste gas, or by an electrostatic precipitator, or by using both. Such methods, however, require a waste water treating device for further cleaning the washing water, and involve inconveniences caused by secondary treatments.

In order to solve these problems, the present inventors have extensively worked on the treatment and utilization of the waste gas generated from the heat-foaming chamber for heat-foaming a foamable thermoplastic resin sheet. This work has led to the discovery of the following facts.

(1) No sublimation product with deposit if the temperature of the waste gas is not lowered to a point below the temperature at which a sublimation product deposits, and the waste gas at a temperature of at least about 200° C. is recycled while limiting the temperature fall within about 10° C.

(2) When the waste gas is burned, the sublimation products in it are decomposed to give a gas substantially free from the sublimation products. For example, if the waste gas at a temperature of about 200° to about 250° C. is heated to a temperature about 150° C. higher, the heat of burning having a temperature of about 50° C. is generated to give a cleaned gas having a temperature of about 400° to about 450° C. and being substantially free from the sublimation products, although the temperature of the heat of burning may vary depending upon the temperature of the sublimation products in the waste gas.

Based on the aforesaid results of the research work, the present inventors have found that there is scarcely any fuel comsumption in the hot air generating device, and the heat-foaming of the foamable sheet can be preformed by using only a fuel for burning the waste gas, if the waste gas at a temperature of about 200° to about 250° C. discharged from the heat foaming-chamber is burned to a temperature of about 400° to about 450° C. and used as a feed gas for heat foaming after optionally it is mixed with the aforesaid waste gas, fresh air, etc. to adjust its temperature to a point suitable for heat-foaming (about 250° to about 350° C.).

It is an object of this invention therefore to provide a method of continuously heating a foamable thermoplastic resin sheet by using a gas obtained by burning the waste gas from the heat-foaming chamber, which method reduces energy consumption and the tendency to air pollution and provides excellent temperature stability.

It is another object of this invention to provide an improved process and apparatus for producing a thermoplastic resin foam which is uniformly foamed and has increased quality.

According to this invention, there is provided, in a process for producing a thermoplastic resin foam which comprises continuously heat-foaming a foamable thermoplastic resin sheet containing a heat-decomposable organic blowing agent with a heated gas, the improvement wherein a gas containing sublimation products generated by the heat-foaming of the foamable sheet is burned to decompose the sublimation products and obtain a treated gas having a substantially reduced content of the sublimation products, and the treated gas is then used as the heated gas for the heat-foaming of the foamable sheet.

A detailed description of the present invention follows.

The "foamable thermoplastic resin sheet" used in the process of this invention is a sheet-like or tubular thermoplastic resin article capable of being foamed under heat by the inclusion of a heat-decomposable organic blowing agent. Usually, the thermoplastic resin article is crosslinked so that its viscosity characteristics at the time of heat-foaming become suitable for foaming. Thermoplastic resins usually employed for the production of foamable thermoplastic resin sheets are applicable to this invention. They include, for example, polyolefin resins such as low-density polyethylene, medium-density polyethylene, high-density polyethylene and polypropylene; ethylene copolymers such as ethylene/propylene copolymer, ethylene/butadiene copolymer, ethylene/vinyl acetate copolymer, ethylene/acrylate copolymers, ethylene/acrylic acid copolymer and ethylene/vinyl choloride copolymer; vinyl copolymers such as vinyl chloride/vinyl acetate copolymer; and blends of vinyl copolymers such as vinyl chloride/vinyl acetate copolymer or the aforesaid polyolefin resins with rubbery materials such as natural rubber, butadiene rubber, isobutylene rubber, nitrile rubber and styrene/butadiene rubber. Inclusion of the rubbery materials into polyolefin resins improves the tensile strength or elasticity of the resulting resin foams.

The heat-decomposable organic blowing agent which can be included in the thermoplastic resins to impart heat-foamability may include organic compounds which are solid or liquid at ordinary temperature (about 20° to about 25° C.), do not decompose at the melting temperature of the thermoplastic resin to be foamed, and decompose generally at a temperature of about 160° to about 210° C. to release a gas. Examples of suitable blowing agents are azodicarbonamide (decomposition temperature 190° C.), N,N'-dinitropentamethylenetetramine (decomposition temperature about 204° C.), and p,p'-hydroxybisbenzenesulfonyl hydrazide (decomposition temperature about 164° C.). The amount of the organic blowing agent added is determined by the desired expansion ratio of the foamed sheet to be obtained, and can generally be [expansion ratio × ½] parts by weight per 100 parts by weight of the thermoplastic resin. For example, when it is desired to attain an expansion ratio of 30, the organic blowing agent is added in a proportion of about 15 parts by weight (30 × ½). Among the above organic blowing agents, azodicarbonamide is most preferred because it decomposes abruptly without a risk of explosion or coloration, and permits so good a balance between the melt-kneading temperature of a mixture of thermoplastic resin and the blowing agent and the foaming temperature of the mixture that a foamed sheet having fine cells is obtained.

When an ethylenic resin such as exemplified above is used as the thermoplastic resin and azodicarbonamide, as the organic blowing agent, the addition of a metal salt of a fatty acid as a foaming aid is preferred because azodicarbonamide disperses well and uniformly in the ethylenic resin, decomposition of azodicarbonamide takes place abruptly, and consequently a good foamed sheet can be obtained. Examples of the metal salt include zinc stearate, aluminum stearate, barium stearate, magnesium stearate, aluminum monostearate, aluminum distearate, aluminum palmitate and aluminum octoate. The amount of the fatty acid metal salt is generally 0.5 to 10 parts by weight, preferably 0.5 to 5 parts by weight, per 100 parts by weight of the ethylenic resin.

As required, the foamable thermoplastic resin sheet may contain suitable amounts of suitable additives such as fillers, pigments, lubricants, antioxidants, fire retardants, crosslinking agents and crosslinking accelerators.

The thermoplastic resin, the organic blowing agent and optional additives are melt-kneaded by methods known per se. for example by using an extruder or a roll mill, and molded into a sheet form such as a flat sheet and a tubular sheet by an extrusion die method, a calendering method and an inflation method. The foamable thermoplastic resin sheet thus molded may generally have a thickness of 0.3 to 7 mm.

The foamable thermoplastic resin sheet so molded may be crosslinked so that the viscosity characteristics of the thermoplastic resin during heat-foaming become suitable for foaming. The crosslinking may be effected, for example, by applying ionizing radiation, or by incorporating a crosslinking agent into the thermoplastic resin.

When ionizing radiation is to be used as a crosslinking means, electron beams, chi-rays, beta-rays and gamma-rays may be used. Industrially, the use of electron beams is preferred. The dose of the ionizing radiation is preferably about 0.5 to about 20 Mrads. If it is less than 0.5 Mrad, there is a tendency to the formation of a foamed sheet having a low expansion ratio and containing non-uniform cells. If it exceeds 20 Mrads, the degree of crosslinking becomes too high, and good foaming tends to be inhibited. For uniform radiation, it is possible, for example, to apply the same dose of electron beams to both the front and back surfaces of the sheet.

The crosslinking agent which may be used to crosslink the thermoplastic resin is preferably an organic peroxide such as dicumyl peroxide (decomposition temperature about 166° C.), 2,5-dimethyl-2,5-di-tert-peroxyhexane (decomposition temperature about 157° C.), and di-tert-butyl perterephthalate (decomposition temperature about 144° C.). Desirably, the organic peroxide has a decomposition temperature at least about 20° C. lower than the decomposition temperature of the organic blowing agent. A combination of azodicarbonamide as the organic blowing agent and dicumyl peroxide as the organic peroxide gives the best result. The foamable sheet containing such a crosslinking agent may be heated to the decomposition temperature of the crosslinking agent to crosslink the resin. The amount of the organic peroxide is preferably such that the gel fraction with respect to hot xylene becomes about 30 to about 45% by weight. The "gel fraction", as used herein, denotes the weight percent of an insoluble portion measured after about 50 mg of a sample is immersed in 25 ml of xylene at 120° C. for 24 hours.

According to the process of this invention, the foamable thermoplastic resin sheet produced as above is then heated with a heated gas in the heat-foaming step to decompose the organic blowing agent containing in the foamable sheet. The heat-foaming is carried out in a customary manner by heating the foamable sheet to a temperature above the temperature at which the organic blowing agent decomposes. The temperature of the heated gas to be fed to the heat-foaming step, which varies depending upon the organic blowing agent used, is generally about 210° to about 350° C., preferably about 250° to about 350° C.

This heating results in the decomposition of the organic blowing agent in the foamable sheet to form a gas and thus expand the sheet. With the heat decomposition of the organic blowing agent and the expansion of the decomposition gas, the decomposition product of the organic blowing agent, the undecomposed blowing agent, etc. in the heated gas are gasified and released. The decomposition product of the organic blowing agent and the undecomposed organic blowing agent contain many components which precipitate as solids during the process of lowering the temperature of the heated gas to room temperature or its vicinity. As stated hereinabove, these solids precipitated are accumulated in the waste gas conveying duct or contaminate the vicinity of the air releasing port.

The term "sublimation products", as used in the present specification and the appended claims, include those components of the gas released from the sheet at the time of heat-foaming it which are deposited as solids when the temperature of the gas is lowered to room temperature or its vicinity, and mainly include the decomposition product of the organic blowing agent, the decomposition product of the fatty acid metal salt used as the foaming aid and the undecomposed organic blowing agent.

The essential feature of the process of this invention is that the gas containing such sublimation products which has been used in heat-foaming the foamable sheet is burned to decompose the sublimation products and to obtain a treated gas having a substantially reduced content of the submination products, and the treated gas is recycled to the heat foaming step to use it again for the heat-foaming of the foamable sheet. Consequently, energy saving and anti-pollution can be achieved and a foamable sheet can be heated with excellent heat stability.

The gas discharged from the heat-foaming step at the time of starting generally contains about 3000 to 500 mg/Nm$^3$, usually about 1500 to about 500 mg/Nm$^3$, of the sublimation products although its amount may vary depending upon the types and amounts of the organic blowing agent and the blowing aid used. Such sublimation product-containing gas is burned in accordance with this invention. The burning can be carried out by a catalytic burning method, or a direct burning method. The catalytic burning method is preferred because the burning temperature is low and the temperature can be easily controlled. A platinum oxide catalyst, for example, is a suitable catalyst for use in this method. Prior to the catalytic burning, the gas containing the sublimation products may be preheated by the burning of a fuel. The fuel may be a gaseous fuel (such as propane gas, natural gas, and city gas) or a liquid fuel (such as kerosene and heavy oil). In view of safety and economy, propane gas (LPG) is preferred. The sublimation product-containing gas may also be pre-heated by an electric heater. The burning temperature in accordance with the catalytic burning method may generally be adjusted to 300° to 450° C., temperatures of about 400° C. being particularly preferred.

As a result of burning the sublimation product-containing gas, a treated gas having a substabtially reduced content of the sublimation products can be obtained. The burning of the sublimation product-containing gas is carried out generally until the content of the sublimation product in the treated gas becomes not more than 150 mg/Nm$^3$, preferably not more than 50 mg/Nm$^3$.

This burning operation gives a treated gas having a higher temperature than the sublimation-containing gas fed into the burning step. The temperature of the sublimation product-containing gas discharged from the heat-foaming step is usually about 200° to about 250° C. When the gas is pre-heated to a reaction temperature (about 350° to about 400° C.), the temperature of the treated gas after burning generally rises by about 20° to about 50° C. Accordingly, the temperature of the treated gas can generally be within the range of about 400° to about 450° C.

As stated hereinabove, the suitable temperature of the heated gas used for heat-foaming the foamable sheet is generally about 250° to about 350° C. If, therefore, the temperature of the treated gas is outside this range, it is cooled to a temperature within the above range and then recycled to the heat foaming step.

The high-temperature treated gas may be cooled, for example, by (i) mixing it with cold fresh air or another gas which does not adversely affect the heat-foaming, such as low-oxygen gas and nitrogen gas, (ii) mixing it with the sublimation product-containing gas discharged from the heat-foaming step which is at a lower temperature, or (iii) performing heat-exchange between the treated gas and the sublimation product-containing gas having a lower temperature by using a heat exchanger.

When the treated gas is to be mixed with the sublimation product-containing gas discharged from the heat-foaming step in accordance with the method (ii) above, it is desirable to mix the two gases such that the content of the sublimation products in the resulting mixed gas becomes not more than 3000 mg/nM$^3$.

The treated gas so temperature-controlled is then again fed into the heat-foaming step for heat-foaming the foamable thermoplastic resin sheet.

According to another aspect of this invention, there is provided an apparatus for performing the process of this invention described above by continuously heat-foaming a foamable thermoplastic resin sheet to form a thermoplastic resin foam, said apparatus comprising a heat-foamable chamber having an inlet portion for feeding the foamable thermoplastic resin sheet, an outlet portion for discharging the foamed sheet, a discharge port for a gas containing sublimation products generated by the heat-foaming of said foamable sheet, and a supply port for a heated gas to be used in the heat-foaming, said discharge port and said supply port being connected by pipe lines to form a circulating pipe line, and said circulating pipe line having a burning device for burning said gas containing sublimation products.

Figure 2:
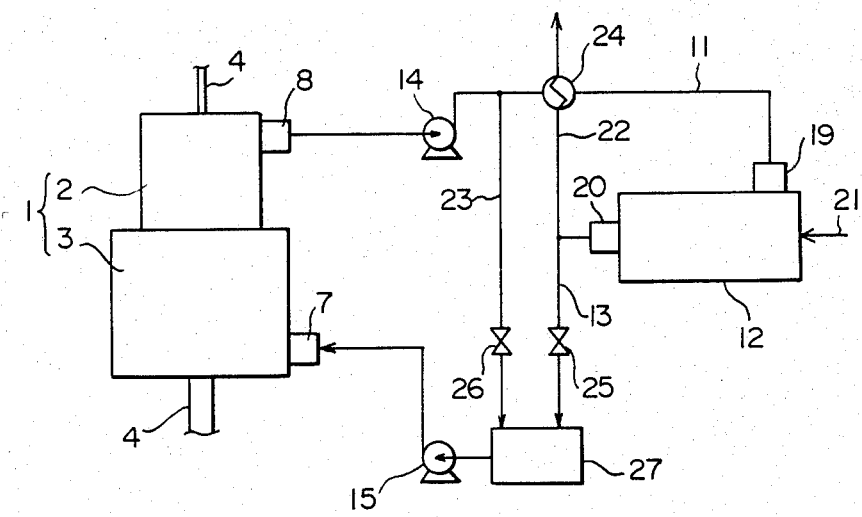

The apparatus used in practicing the process of this invention will be described in detail with reference to the accompanying drawings in which:

FIG. 1 is a schematic flow chart showing one embodiment of the apparatus for practicing the process of this invention; and FIG. 2 is a schematic flow chart for illustrating another embodiment of the apparatus used for practicing the process of this invention.

As FIG. 1 shows, there is provided a heat-foaming chamber 1 comprised of a pre-heating chamber 2 and a foaming chamber 3. At the upper portion of the pre-heating chamber 2 is located an inlet portion 5 adapted to receive a foamable sheet 4. The upper portion of the foaming chamber 3 communicates with the bottom of the pre-heating chamber 2, and an outlet portion 6 for the foamed sheet is opened at the bottom of the foaming chamber 3.

A supply port 7 for a heated gas is provided near the bottom of the foaming chamber 3, and a discharge port 8 for discharging the gas is provided near the top of the pre-heating chamber 2. Desirably, the heat-foaming chamber 1 has a wall with a heat insulating material attached thereto in order to prevent heat radiation and minimize heat losses.

Radiation heaters 9 and 10 may, as required, be provided within the pre-heating chamber 2 and the foaming chamber 3, respectively. In particular, the heater 10 within the foaming chamber 3 can be desirably adapted to give heat waves to the sheet in the final stage of heat-foaming and limits the starting of foaming at a predetermined position in the sheet passing portion of the foaming chamber 3.

The foamable sheet 4 is introduced into the pre-heating chamber 2 through the inlet portion 5, then introduced into the foaming chamber and foamed, and finally withdrawn from the discharge port 6. Thus, a foamed sheet is produced.

The structure of the heat-foaming chamber is the same as in the prior art. The characteristic feature of the present invention is that the discharge port 8 and the supply port 7 are connected by a line 11, a burning device 12 and a line 13 to form a circulating line. Blowers 14 and 15 are provided to conduct the gas to the line 11 and the supply port 7.

The burning device 12 is comprised, for example, of a burning chamber 16, a catalyst element 17, a gas pre-heater 18 and an automatic control device (not shown), and the burning chamber 16 may, for example, be made of stainless steel.

The catalyst element 17 and part of the pre-heater 18 are disposed in the burning chamber 16, and the burning device 12 has a waste gas supply port 19 for entry of the waste gas before burning and a treated gas discharge port 20 for discharge of the burnt and cleaned gas (treated gas). As required, a manhole for mounting or inspecting the catalyst element, a hole for temperature measurement (both are not shown), etc. may be provided in the burning chamber 16. The gas may be pre-heated by using a gaseous fuel such as city gas or propane gas or a liquid fuel such as kerosene, or by using an electric heater. When, for example, propane gas is used, a burner for it is disposed within the burning chamber 16.

The gas pre-heater 18 may be equipped with a blower for supplying air for the burner, pipes for conveying propane gas and air, valves, a pressure gauge, etc. The automatic control device may be comprised of a burning control device, a temperature indicating regulating meter, a pressure switch, etc., and is provided in a control panel and the aforesaid pipes and burning chamber. The reference numeral 21 represents a fuel pipe line.

In the catalyst element 17 is preferably used a catalyst which contributes to the acceleration of the rate of the reaction in the burning of the waste gas and does not change itself during the reaction. In order to bring the catalyst into contact with the gas, a carrier is generally used. The carrier may, for example, be in the form of granules, a honecomb or a metallic sponge. For the convenience of mounting and detaching, the carrier is desirably constructed in an element. The area of the passage of the gas through the catalyst bed and the thickness of the catalyst can be selected properly depending upon the amount of the air treated.

The waste gas from the discharge port 8 is introduced into the waste gas supply port 19 of the burning chamber 16 through the line 11 by means of the blower 14, and pre-heated by the burning of the fuel supplied from the fuel pipe line 21 in the gas pre-heater 18. The pre-heated gas is burned during passage through, for example, the gas-permeable catalyst element 17, and the sublimation products in the waste gas are decomposed. At this time, the heat of burning is generated, a rise in temperature determined by the content of the sublimation products occurs. The high-temperature treated gas so obtained is discharged from the discharge port 20, and partly removed out of the system through a line 22. The rest is fed into the supply port 7 by the blower 15 via the line 13 for use in heat-foaming the foamable sheet 4. The line 13 may be connected to a line (not shown) for introducing cold fresh air or an inert gas for temperature control of the high-temperature treated gas.

FIG. 2 shows another embodiment in which a by-pass line 23 is also provided in the circulating line, and a mixture of the waste gas and the treated gas is used and the treated gas is used for pre-heating the waste gas by a heat exchanger 24. The same parts of FIG. 2 as in FIG. 1 are designated by the same reference numerals.

The waste gas discharged from the discharge port 8 by the blower 14 is partly conducted through the by-pass line, and the remainder is fed into the burning device 12 through the line 11 via the heat exchanger 24.

The treated gas is dividedly sent through the lines 13 and 22. The gas in the line 22 is the high-temperature side of the heat exchanger 24 and gives heat for pre-heating the waste gas passing through the line 11 and is then released out of the system. Required amounts of the gas in the line 13 and the gas in the by-pass line 23 are fed into a mixer 27 by means of valves 25 and 26 and mixed there. The gaseous mixture is introduced by the blower 15 into the supply port 7 for use in heat-foaming the foamable sheet 4.

In FIGS. 1 and 2, the heat-foaming chamber is of a vertical type in which the foamable sheet and the foamed sheet are suspended by gravity. The present invention, however, is not limited to this particular type, and may also be applied to a horizontal heat-foaming chamber in which the sheet is conveyed horizontally.

According to the process or apparatus of this invention described above, the energy consumed in the production of a thermoplastic resin foam by heat-foaming a foamable thermoplastic resin sheet can be drastically reduced, and air pollution by the waste gas can also be reduced.

Furthermore, according to the process or apparatus of this invention, the temperature of the heated atmosphere for the foamable thermoplastic resin sheet can be easily stabilized, and a thermoplastic resin foam of high quality which is foamed uniformly can be produced.

The following Examples illustrate the present invention more specifically.

Example 1

A sheet is molded by a known extrusion method from 100 parts by weight of low-density polyethylene (density 0.915 g/cm$^3$), 15 parts by weight of azodicarbonamide and 2 parts by weight of zinc stearate. Electron beams in a dose of 3 Mrads were applied to the resulting sheet to give a foamable sheet having a thickness of 1.5 to 2 mm and a width of 330 mm.

The foamable sheet was introduced into the heat-foaming chamber 1 of the apparatus shown in FIG. 1 at a rate of 2 m/min. In the meanwhile, treated gas at a temperature of about 370° C. was introduced from the supply port 7. Thus, the foamable sheet was heat-foamed to give a foamed sheet having a thickness of 24 mm, a width of 940 mm and an expansion ratio of about 30.

At this time, the temperature of the gas discharged from the gas discharge port 9 of the heat-foaming chamber 1 was about 200° C., and the content of the sublimation products in the waste gas was 1000 mg/Nm$^3$.

The content of the sublimation products in the gas was determined by sampling a part of the gas using a metering pump, cooling it to room temperature, measuring the amount of the precipitated solid material, and calculating the amount of the precipitated solid per Nm$^3$.

The sublimation product-containing gas was fed into the burning chamber 16 by the blower 14 through the line 11.

In the burning chamber 16, the gas was pre-heated to about 350° C. by means of the propane burner 18, and passed through the catalyst element 17 composed of a platinum containing oxidation catalyst supported on a mat-like porous Nichrome to decompose the sublimation products in the gas. The temperature of the gas further rose by the heat of burning, and a treated gas having a temperature of about 370° C. was obtained. The content of the sublimation products in the treated gas was about 15 mg/Nm$^3$.

The treated gas at about 370° C. was discharged from the discharge port 20, and a part of it is released through the line 22. The remainder was recycled to the foaming chamber 3 through the pipe line 13 and the blower 15. In the meantime, fresh air in nearly the same amount as the amount released from the line 22 was taken into the foaming chamber 3 through the outlet portion 6 to adjust the inside temperature to one suitable for foaming.

When the process of this invention described in the above embodiment is compared with a conventional method in which hot fresh air (370° C.) is fed from the hot air supply port 7 of the heat-foaming chamber and the waste gas is directly discharged from the gas discharge port 8, it is seen that the energy consumed by the process of this invention is about two-thirds of that in the conventional process.

Example 2

A foamable sheet produced as in Example 1 was introduced into the heat foaming chamber 1 of the apparatus shown in FIG. 2. In the meantime, a treated gas at a temperature of about 300° C. was introduced from the supply port 7. Thus, the foamable sheet was heat-foamed to give a foamed sheet having a thickness of 4 mm, a width of 940 mm and an expansion ratio of about 30.

The temperature of the gas discharged at this time from the gas discharge port 8 of the heat-foaming chamber 1 was about 200° C., and the content of the sublimation products in the waste gas was 2,500 mg/Nm$^3$.

The gas containing sublimation products discharged from the discharge port 8 at a rate of 25 Nm$^3$/min. was sent through the line 11 and the blower 14, and partly fed into the mixer 27 through the line 23. The remainder was sent to the burning chamber 16 through the heat exchanger 24.

The gas was pre-heated to about 350° C. by heat exchange at the heat exchanger 24 and by the propane burner 18 in the burning chamber 16, and by the same catalyst element 17 as used in Example 1, the sublimation products in the gas were decomposed. By the heat of burning at this time, the temperature of the gas further rose, and a treated gas having a temperature of about 400° C. was obtained. The content of the sublimation products in the treated gas was about 35 mg/Nm$^3$.

The treated gas at about 400° C. was discharged from the discharge port 20, and a part of it was released from the line 22 via the heat exchanger 24. The remainder (12 Nm$^3$/min.) was sent to the mixer 27 through the line 13. In the mixer 27, it was mixed with the sublimation product-containing gas from the line 23 to obtain a gaseous mixture having a temperature of about 300° C.

The gaseous mixture was then recycled to the foaming chamber 3 through the blower 15. In the meantime, fresh air in an amount nearly equal to the amount released from the line 22 was taken into the foaming chamber 3 through the outlet portion 6 to adjust the inside temperature to one suitable for foaming.

When the process of this invention described in the above embodiment is compared with a conventional method in which fresh hot air (300° C.) is fed from the hot air supply port 7 of the heat-foaming chamber and the waste gas is directly discharged from the gas discharge port 8, it is seen that the energy consumed by the process of this invention is about one-third of that in the conventional process.

According to the process and apparatus of this invention described hereinabove, the conventional hot air generating device is no longer necessary. Since the gas containing sublimation products is cleaned by the burning device and heated by a heat exchanger, no pipe blockage occurs and the energy consumed can be drastically reduced.

The temperature of the treated gas is stable and does not fluctuate because the burning is effected, for example, by using a catalyst. For example, according to the embodiment shown in FIG. 2 (Example 2), the treated gas is mixed in the mixer after the degrees of opening of the valves 25 and 26 are adjusted. Accordingly, the inside of the heat-foaming chamber assumes a very stable condition free from temperature fluctuations. The foam starting position of the sheet within the foaming chamber is stabilized and a thermoplastic resin foam of good quality can be obtained.

According to the process and apparatus of this invention, the amount of the fuel used is less than about two-thirds of that in the conventional process, and a conventional wet-type waste gas treating device is quite unnecessary.

What is claimed is:

1. In a process for producing a thermoplastic resin foam which comprises continuously heat-foaming a foamable thermoplastic resin sheet containing a heat-decomposable organic blowing agent with a heated gas, the improvement wherein a gas containing sublimation products generated by the heat-foaming of the foamable sheet is burned to decompose the sublimation products and obtain a treated gas having a substantially reduced content of the sublimation products, and the treated gas is then used as the heated gas for the heat-foaming of the foamable sheet.

2. The process of claim 1 wherein the foamable sheet is crosslinked thermoplastic resin sheet containing the heat-decomposable blowing organic blowing agent.

3. The process of claim 1 wherein the gas generated by the heat-foaming of the foamable sheet contains 500 to 3,000 mg/Nm$^3$ of the sublimation products.

4. The process of claim 1 wherein the burning of the gas containing sublimation products is carried out by a catalytic burning method.

5. The process of claim 1 wherein the gas containing sublimation products is pre-heated prior to the burning.

6. The process of claim 1 wherein the treated gas is mixed with the gas containing sublimation products, and the gaseous mixture is used as the heated gas for the heat-foaming of the foamable sheet.

* * * * *